United States Patent [19]

Johnson

[11] Patent Number: 4,777,684

[45] Date of Patent: Oct. 18, 1988

[54] APPARATUS AND METHOD FOR CUSTOM TINTING SOFT CONTACT LENSES BY DISPENSER OF LENSES

[76] Inventor: Carl S. Johnson, 2611 Telegraph Avenue, Oakland, Calif. 94612

[21] Appl. No.: 84,175

[22] Filed: Aug. 12, 1987

Related U.S. Application Data

[62] Division of Ser. No. 834,203, Feb. 27, 1986, Pat. No. 4,705,370.

[51] Int. Cl.$^4$ .......................... D06P 3/00; G02C 7/04
[52] U.S. Cl. ..................................... 8/507; 351/160 R; 351/160 H; 351/161; 351/162; 351/177
[58] Field of Search ............................................. 8/507

[56] References Cited

U.S. PATENT DOCUMENTS

| | | | |
|---|---|---|---|
| 4,518,390 | 5/1985 | Rabenau et al. | 8/507 |
| 4,553,975 | 11/1985 | Su | 8/507 |
| 4,634,449 | 1/1987 | Jenkins | 8/507 |
| 4,705,370 | 11/1987 | Johnson | 351/162 |

FOREIGN PATENT DOCUMENTS 122771 10/1984 European Pat. Off. .

Primary Examiner—A. Lionel Clingman
Attorney, Agent, or Firm—John J. Leavitt

[57] ABSTRACT

Presented is a method and apparatus for custom tinting soft contact lenses in the dispensing office prior to dispensing such lenses to the wearer, or even after they have been dispensed and worn for a time. In the past, contact lenses have been tinted by mass production means by a very limited number of manufacturers. In one aspect, this invention presents a device that can be used by a dispensing optician, optometrist or ophthalmologist to custom tint soft contact lenses to the specification of the wearer while the wearer waits for the lenses to be tinted. In terms of structure, the apparatus comprises a hand-held device into which a soft contact lens may be deposited and sealed and subjected to the chemical reaction of an appropriate dye to tint the contact lens to the requisite color. The lens is held contained within the device for requisite time to secure adequate reaction of the dye stuff with the material from which the lens is manufactured, and subsequently the dye is flushed from the apparatus and the lens removed.

6 Claims, 2 Drawing Sheets

APPARATUS AND METHOD FOR CUSTOM TINTING SOFT CONTACT LENSES BY DISPENSER OF LENSES

This is a division of co-pending application Ser. No. 834,203 filed on Feb. 27, 1986 now U.S. Pat. No. 4,705,370.

BACKGROUND OF THE INVENTION

1. Field of the Invention

This invention relates to soft contact lenses, and particularly to a method and apparatus for tinting such soft contact lenses within the dispensing office, or in soft contact lens manufacturing facilities.

2. Description of the Prior Art

The search of the prior art has revealed the existence of the following U.S. Pat. Nos. which are believed to be the most pertinent related to the subject matter of this application: 2,241,415; 3,034,403; 3,171,869; 3,557,261; 3,679,504; 3,992,563; 4,157,892; 4,252,421; 4,349,470; 4,4,6,814; 4,447,474; 4,460,523; 4,468,229; 4,472,327; 4,494,954; 4,518,390.

Out of this group of patents, only U.S. Pat. Nos. 2,241,415; 3,557,261; 4,447,474; 4,460,523; 4,472,327 and 4,518,390 appear to show any type of structure for tinting existing contact lenses, and it does not appear from these patents that the structures illustrated in these patents in any way conflict with the method and apparatus disclosed and claimed herein by applicant. The remaining patents mentioned above relate to various methods and processes, some of which may produce the same end result produced by applicant through the practice of his invention disclosed herein, but which differ substantially from applicant's method and apparatus.

Applicant has been an optometrist for a number of years and has been in communication with many other optometrists, dispensing Opticians and Ophthalmologists and various optical equipment manufacturers and has observed that in the great majority of cases almost all dispensing Opticians, Optometrists and Ophthalmologists order tinted soft contact lenses from only a very limited number of manufacturers and distributors. A brief synopsis of the industry will promote an understanding of the problem solved by the subject invention.

Soft contact lenses are prescribed and fitted by three types of eye care practitioners: Ophthalmologists, Optometrists, and, to a limited extent, Opticians. It has been reported that there are about 12,500 Ophthalmologists in the United States, with 11,000 of these involved in regular patient care as hospital or office-based physicians. It has been estimated that half or more of these eleven thousand Ophthalmologists offer dispensing services in addition to prescribing corrective eyewear, sometimes in conjunction with Opticians. It has been estimated these 11,000 Ophthalmologists account for 30% of the total retail corrective lens market and about 20% of the contact lens market, operating from six thousand locations with revenues of 1.35 billion dollars. It is interesting to note that of all dispensing Ophthalmologists, as of 1984 more fit soft lenses (73%) than hard lenses (71%) or gas permeable lenses (51%). It is also interesting to note that with respect to Ophthalmologists' contact lens practices, the cost of being fitted with contact lenses by an Ophthalmologist has decreased significantly in recent years. For example, in late 1978, the average cost of soft contact lenses from this source was $308.00; in 1979, it had fallen to $292.00, and by the end of 1982, to $262.00. It has been observed that in general, the prices paid to Ophthalmologists for contact lenses are, on average, higher than those paid to Optometrists or Opticians.

With respect to Optometrists, in December of 1984 it was reported that there are approximately 22,000 practicing Optometrists in the United States. Of these, 80% (about 17,600) work independently. The other 20% include Optometrists working for chain optical houses and about 2,000 who work for Government, health maintenance organizations or Ophthalmologists.

It has been reported that of the contact lenses fitted by Optometrists, 69% are soft contact lenses and only 17% are hard contact lenses. Doctors of Optometry average twelve pairs of new contact lens fittings per month (compared to ten for Ophthalmologists), and their fees generally lie between those of Ophthalmologists and Opticians. The cost of being fitted for contact lenses by Optometrists is reported to be falling, following the general industry trend. In late 1978, for example, it was reported that new soft lenses cost $285.00, but by 1979, the cost was down to $258.00 and by 1982, the cost had been reduced to $218.00.

With respect to dispensing Opticians, it has been reported that only 22 states license Opticians. The Opticians Association of America estimates that there are about 26,000 dispensing Opticians in the United States. There apparently has been a higher growth rate among Opticians than among Ophthalmologists or Optometrists, reflecting their increasing roles as primary fitters and as adjuncts to the other two classes of practitioners. It has been reported that 55% of independent dispensing Opticians fit soft contact lenses while 52% fit the hard contact lens. Additionally, it has been reported that 80% of all contact lenses fitted by independent dispensing Opticians are of the soft contact lens type and only 13% are of the hard contact lens type. With respect to cost, prices paid for lenses acquired from Optician outlets tend to be the lowest in the industry, with the large chains charging somewhat less than the independents and small chains. For 1981, for instance, the first year for which separate data are available, independent and small chain Opticianries charged, on average, $178.00 for soft lenses; in 1982, their average price was $160.00.

It appears however that the contact lens distribution mechanism is changing very rapidly because of the entry into the contact lens business of optical and drug chains. Data on optical and drug chains and the number of the contact lenses fitted from this source are particularly difficult to come by, and when available, are obscure or commingled with data for independent and small chain outlets. However, the data that are known indicate that large chains now provide as much as 40% of all contact lens fittings. Obviously, this large share of the market is both a cause and a result of the downward price trends observed for all contact lens fitters. Chain outlets offer lenses at lower prices than other sources ($100.00 per pair of soft contact lenses in 1982) and thus exert a downward pressure on the entire price structure of contact lenses, including soft contact lenses.

As late as 1978, 43 states placed restraints on price advertisements by eye care dispensers. In that year, however, the United States Federal Trade Commission overruled these laws and thus paved the way for the great growth of chain outlets, price rivalry, and price reductions. Since low price appears to be a key strategy of chain outlets, the FTC ruling strongly enhanced their market position. Indeed, observation makes it apparent that large chains are growing larger through expansion and merger, and the establishment of manufacturers' outlets, even to the extent of offering franchises to Optometrists and Opticians. It is obvious that the large optical chain has become an important part of the contact lens distribution mechanism and promises to play a larger role in future years. For instance, in 1982, it was reported that eight of the largest chains control approximately 2,164 outlets for contact lenses, with only three of these large chains controlling approximately 1,765 outlets.

The marketing of contact lenses, both hard and soft, to dispensers is effected through distribution by manufacturers of their contact lenses to the three groups of dispensers, who in turn make them available to patients. Thus, manufacturers' promotional efforts are mainly directed to these professionals. It is at this point that the tinted soft contact lens enters the picture. The large inventories of contact lenses required by the manufacturers to be maintained in-house by the professionals may or may not include tinted soft contact lenses. The problem involves a number of factors including cost, availability of suitable colors, the time frame within which suitably tinted soft contact lenses may be supplied by a manufacturer, and the ultimate opinion of the purchaser as to the cosmetic effect of the tinted soft contact lenses.

Accordingly, it is one of the objects of the present invention to make it possible for each of the dispensers, whether he be an ophthalmologist, an optometrist, or a dispensing optician, to custom tint an existing "raw", i.e., clear, contact lens in his own shop or laboratory or office, often while the patient or purchaser waits for the lens to be tinted the same day it is ordered.

Another object of the invention is the provision of a kit which includes the dyes necessary to effect tinting of the "raw" or clear lenses, the apparatus to be used by the dispenser in effecting the tinting by the application of dye to the soft contact lens, the apparatus being susceptible of manipulation by hand to tint single soft contact lenses or pairs thereof.

Still another object of the invention is the provision of apparatus adapted to be kept in the optician's, optometrist's, ophthalmologist's or soft lens manufacturer's facility, shop or office, and which is readily available for use by the dispenser to effect tinting of soft contact lenses on an indiviudal basis so as to customize the intensity of the tinting operation to the suitability of the purchaser.

Another object of the invention is the provision of a method of operation of such apparatus to effect the tinting of soft contact lenses.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the apparatus and method of the invention includes the provision of a relatively small and hand-held apparatus which permits the admission of an existing soft contact lens into the apparatus, in such a manner that portions of the enclosed contact lens to be tinted are exposed within the apparatus while the enclosed contact lens is sealed in such a way within the apparatus that areas of the contact lens not intended to be tinted are sealed from those areas that are intended to be tinted. The apparatus provides means for the admission of an appropriate dye into the apparatus so that such dye comes into intimate contact with those areas of the contact lens intended to be tinted. After injection of the dye into the apparatus and contact of the dye with the specific lens area to be tinted, the apparatus may be set aside for a prescribed time, about 15 to 30 minutes, to permit a reaction to take place between the dye and the lens material, the length of time that the dye is permitted to remain in contact with the lens material in large measure determining the intensity of the tint of the lens. After the prescribed time, the dye material is flushed from the apparatus and the lens is rinsed with a saline solution while maintained within the apparatus, the rinse solution coming into contact with those areas of the lens that have previously been subjected to the dye. The purpose of the rinse is to remove all traces of the dye from the lens and the apparatus prior to release of the lens from the cavity within which it is sealed. Thereafter, the tinted lens is removed from the apparatus and subjected to immersion in a buffer solution for a prescribed time to insure that no trace of the dye remains on the surface of the contact lens, and to return the lens to the proper pH value. Thereafter, the lens is removed from the buffering solution, rinsed with saline and placed in a sterile saline solution until dispensed to the patient.

DESCRIPTION OF THE PREFERRED EMBODIMENT

Figure 1:
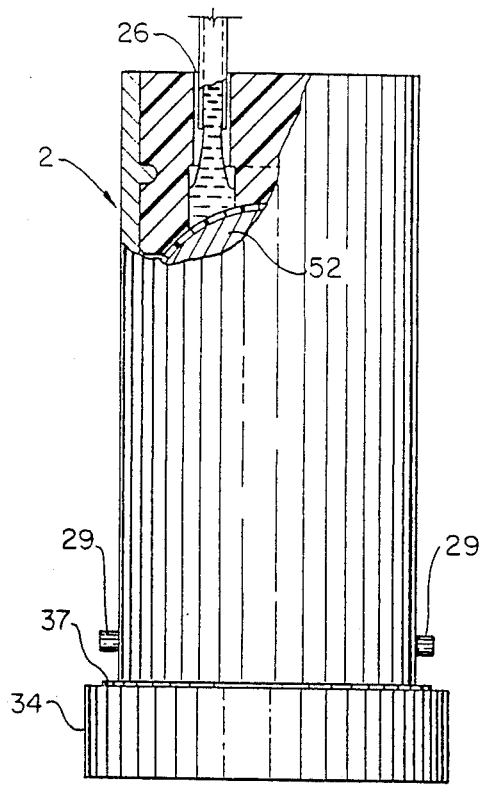
FIG. 1 is an elevational view illustrating the completed apparatus. A portion of the structure is broken away to reveal the dye reservoir.
Figure 2:
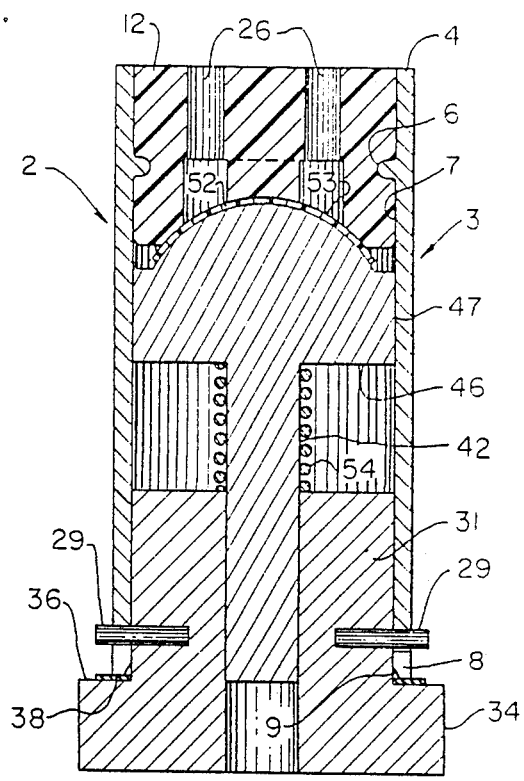
FIG. 2 is a vertical cross-sectional view, partly in elevation of the apparatus illustrated in FIG. 1.

In terms of greater detail, the soft contact lens tinting apparatus of the invention is illustrated in its assembled forms in FIGS. 1 and 2, and designated generally by the numeral 2. As there illustrated, the apparatus comprises a tubular housing member designated generally by the numeral 3, and fabricated preferably from a synthetic resin such as polypropylene, or a metal such as stainless steel, or other suitable material that is dimensionally stable and not subject to corrosion or deterioration. The tubular housing 3 is open at its upper end 4 and is provided with a radially inwardly extending bead 6 spaced from the open end 4 for a purpose which will hereinafter be described. Except for the inwardly extending bead 6, the interior surface 7 of the tubular housing 3 is of uniform diameter to adjacent the opposite end portion 8 of the tubular housing, where the inner periphery of the tubular housing is provided with an outwardly tapering surface 9 as shown.

Figure 8:
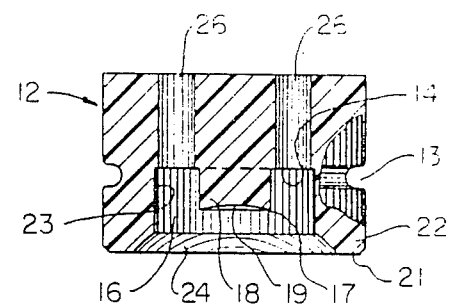
FIG. 8 is a vertical cross-sectional view of the sealing die that is inserted into the tube or shroud and which cooperates with the plunger to seal off portions of the contact lens disposed between the sealing die and the plunger.
Figure 4:
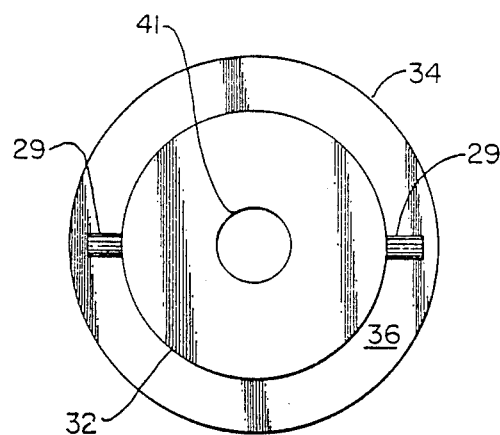
FIG. 4 is a plan view of the base member illustrated in FIG. 3.
Figure 9:
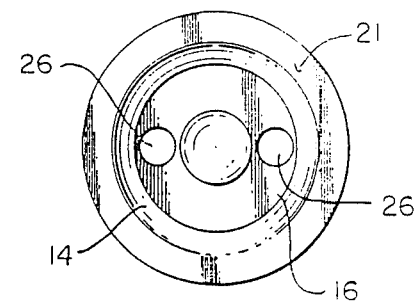
FIG. 9 is a bottom plan view of the sealing die illustrated in FIG. 8.
Figure 3:
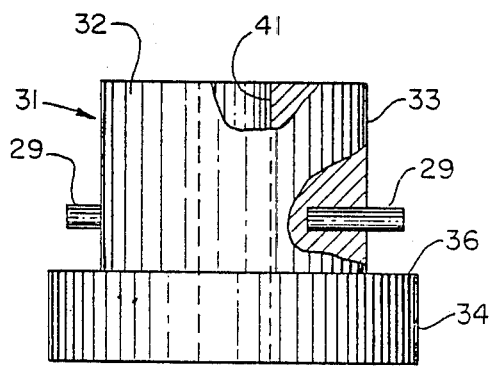
FIG. 3 is an elevational view of the base member of the apparatus apart from the remaining structure, portions being broken away to reveal underlying structure.

Fitted into the upper end of the tubular housing 3 is a sealing die designated generally by the numeral 12 and retained in position within the interior of the tubular housing by the circular bead 6 which projects into a complimentarily configured annular groove 13 formed around the outer periphery 14 of the sealing die. The construction of the sealing die is illustrated in detail in FIGS. 8 and 9, shown apart from the rest of the structure, and in FIG. 2 illustrating the cylindrical configuration of the outer periphery of the sealing die which is dimensioned to fit snugly into the tubular housing if the sealing die is adapted to be removably secured within the tubular housing, or, as preferred, intimately contacting the inner peripheral surface 7 of the tubular member 3 if the sealing die is cast in place in the upper end of the tubular housing as illustrated in FIG. 2. As illustrated in FIG. 8, the sealing die is provided with a counterbore 16 which bottoms out at a level 17 and which at its end adjacent the surface 17 is annular in configuration to form a projecting stud or post 18 centrally disposed within the sealing die 12, and provided with a concave surface 19. To provide some idea of the size of the sealing die, it is noted that in an actual model, the overall diameter of the sealing die, which corresponds very closely to the inner diameter of the tubular housing 3, is only 18.2 millimeters, while the diameter of the cylindrical post 18 may range from 4 to 4.5 millimeters. This diameter, it will be recognized, roughly coincides with the diameter of the iris in the human eye.

At its lower end 21, it will be seen that the wall 22 is provided with an interior periphery 23, and that in the area 24 the interior periphery of the sealing die is chamfered or formed as illustrated, the chamfered surface 24 being semi-spherical in configuration. An extension of the spherical surface 24 into the region of the concavity 19 on the post 18 would coincide to the curvature of the concavity 19, so that the curved concave surface 19 is in effect an isolated or spaced extension of the curved surface 24. Again merely to illustrate the close tolerances that are designed into the apparatus, the diameter of the counterbore 16 may conveniently be set to between 11.5 millimeters and 12 millimeters, while the base diameter of the chamfered area 24 is 13.5 millimeters. Referring again to FIG. 8, it will be seen that there are two radially spaced bores 26 projecting axially parallel to the longitudinal axis of the sealing die and extending through the bottom surface 17 of the counterbore 16 so that each of the bores 26 communicates with the annular chamber forming the bottom portion of the counterbore 16 surrounding the centrally disposed post 18.

I have found that this sealing die may be conveniently molded from silicone or any other soft, pliable material that is non-toxic or non-contaminating to the lens material. As indicated previously, the sealing die may be related to the surrounding tubular housing 3 in a detachable manner, or, as illustrated in FIG. 2, the sealing die may be molded in situ.

Figure 5:
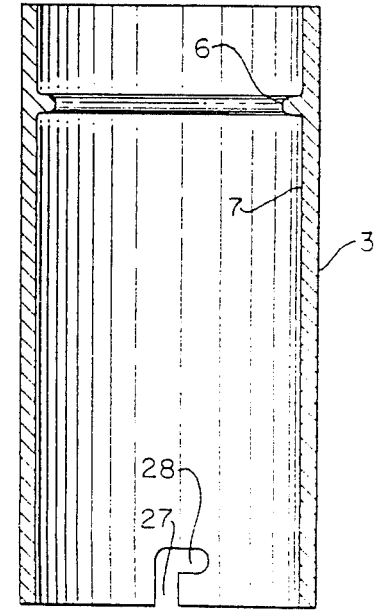
FIG. 5 is a cross-sectional view of the housing or shroud adapted to be detachably mounted on the base member.

Referring to FIGS. 2 and 5, it will be seen that the lower end of the tubular housing 3 is provided on diametrically opposite sides of the tube with slots 27 that extend axially along the tube for a predetermined distance and lead into a transverse locking recess 28 as shown. The two diametrically opposite slots 27-28 are adapted to receive in detachable engagement, the radially outwardly projecting lock lugs 29 that lie fixedly embedded in the base member designated generally by the numeral 31, which is formed from an appropriate metal or plastic material to provide a tubular extension 32 having an outer periphery 33 the diameter of which is gauged to form a snug slip fit with the interior circumference 7 of the tubular housing 3. Around one end, the base member 31 is provided with a collar 34 adapted to provide a shoulder 36 on which is supported an annular and resilient seal ring 37 against which the lower edge 38 of the tubular housing 3 may abut when the lock lugs 29 are detachably caught in the slots 27-28. Preferably, the seal ring 37 is fabricated from a resilient material so that when the tubular housing 3 is pressed downwardly against the seal ring 37 and rotated slightly to engage the projecting lugs 29 in the recesses 28, there will remain a slight upward bias on the tubular housing 3 provided by the natural or inherent resilience of the seal ring 37. This will insure that during manipulation of the apparatus the union between the tubular housing 3 and the base member 31 will not be inadvertently broken, while permitting the tubular housing to be removed from the base member 31 at will.

Figure 6:
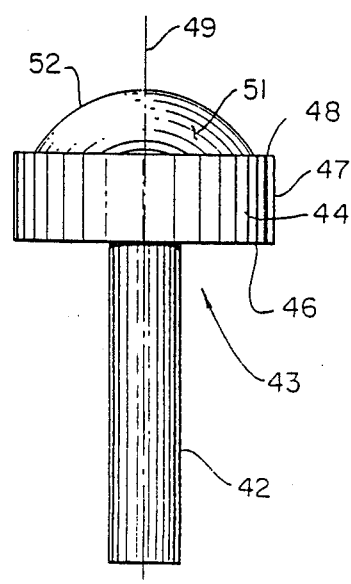
FIG. 6 is an elevational view of the support plunger on which the soft contact lens is supported during the tinting operation.
Figure 7:
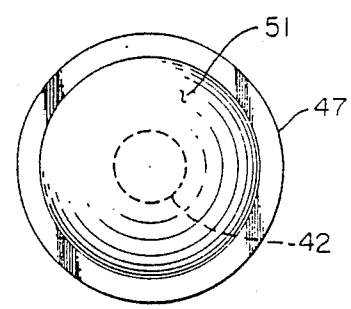
FIG. 7 is a top plan view of the plunger of FIG. 6.

Extending axially through the base member 31 is a central bore 41 that extends through the entire length of the base member 31. In an actual model of the apparatus, the bore is approximately 4.9 millimeters in diameter, and snugly receives in a sliding slip fit the stem 42 of the plunger designated generally by the numeral 43 and illustrated in FIGS. 6 and 7. The plunger is provided at one end with a cylindrical head 44 the bottom surface 46 of which is integral with the stem 42 and perpendicular to the longitudinal axis thereof. The cylindrical surface 47 is gauged to make a snug slip fit with the interior surface 7 of the tubular housing 3, the fit being preferably gauged so that there is no perceptible transverse movement of the plunger head 44 in the bore of the tubular housing 3, but with sufficient tolerance between the two surfaces to permit the sliding advancement of the cylindrical head 44 within the tube.

The top surface 48 of the cylindrical head 44 is parallel to the bottom surface 46 and of course perpendicular to the longitudinal axis 49 of the plunger. Formed on the top surface 48 of the cylindrical head 44 is a semispherical dome 51 having a curved or arcuate surface 52 which may be spherical but which need not be spherical. Regardless of the curvature of the curved surface 52, it should be understood that the curvature of this surface is complementary to the curvature of the curved chamfer 24 as illustrated in FIG. 8, so that when a soft contact lens body 53 (FIG. 2) is draped over the dome 51 as illustrated in FIG. 2 so that its posterior concave surface conforms to the underlying convex surface 52, an annular band next adjacent the outer periphery of the contact lens lies sealed between the annular curved surface 24 and the complementary curved surface 52 of the plunger while a central portion of the soft contact lens lies sealed between the concave surface 19 of the central post 18 and the central portion of the curved surface 52 as illustrated.

With the soft contact lens thus disposed between the sealing die and the plunger, the parts are retained in this relationship by a coiled compression spring 54 disposed between the top surface of the base member 31 and the surface 46 of the plunger to resiliently bias the plunger in an upward direction as illustrated in FIG. 2. The tension of the coil compression spring is gauged to maintain a resilient force on the plunger and maintain the seal between the top surfaces of the contact lens 53 and the associated contiguous surfaces of the sealing die 12.

It will of course be understood that the soft contact lens 53 is placed on the dome 51 with the tubular housing 3 removed from the base structure 31. After placement of the soft contact lens on the dome 51, the tubular housing is dropped over the assembly of base member and plunger and the laterally projecting lugs 29 are locked in the slots 28. At this point, an appropriate dye is injected into the apparatus through the aperture 26 (FIG. 8) so that the annular area of the soft contact lens that lies surrounding the central post 18 on the one hand and the inner periphery 23 of the sealing die on the other hand, is exposed to the dye, which is injected in a sufficient quantity, as illustrated at 56 in FIG. 1, to provide a reservoir of such dye that lies trapped in the annular chamber at the face of the counterbore 16. Thus, an annular surface of the soft contact lens is in intimate contact with the pool of liquid dye, this relationship being maintained for a sufficient time, say 15 to 30 minutes, depending upon dye concentration and temperature, to secure the intensity of tinting of the soft contact lens that is desired by the patient. I have found that, depending upon the materials used for the contact lens, and the type of dye injected into the apparatus, the time of intimate contact between the contact lens and the dye may range from ten minutes to two hours. I have also found that the time element is reduced if the plunger 43 is heated to about 150° F. prior to insertion into the tubular housing. Preferably, the entire apparatus is heated to approximately 150° F., so that thermal equalization of all of the parts of the assembly occurs prior to insertion of the soft contact lens, so that heat from the associated parts in contact with the contact lens is conducted into the contact lens material itself. Additionally, I have found that the reaction between the contact lens material and the dye is enhanced if the dye itself is heated to approximately 150° F.

Heating the parts to approximately 150° F. does not render them too hot to touch with the bare hands, and assures a rather rapid reaction between the dye and the exposed portion of the contact lens. I have found further that it is only the exposed portion of the contact lens that is tinted, i.e., the dye material does not migrate laterally through the contact lens material so as to form an indefinite inner and outer periphery. Rather, the line of demarcation between the untreated lens material and the treated or dyed lens material is sharp and clear and defined by the limits imposed by the apparatus.

After the requisite time has passed for the reaction to have completed the dying of the lens to the intensity desired, the surplus dye is asperated from the apparatus by an appropriate suction device forming no part of this invention. Alternatively, the entire apparatus may be inverted, at which time the dye will run out of the reservoir in which it is contained in the apparatus and be disposed of in any convenient manner.

No attempt is made to salvage this excess dye product. Following removal of the excess dye, the entire apparatus may be held under a stream of appropriate rinsing solution which may be saline solution, or another appropriate solution which floods the chamber in which the dye was previously contained and rinses therefrom all vestiges of the dye. Following such rising, which may proceed for a specific time, the tubular housing is removed from the base member, thus giving access to the now tinted soft contact lens which remains loosely adherent on the domed surface 52. The lens is removed from the domed surface, and immersed in an appropriate buffer solution for approximately 1 to 3 hours. Such buffer solution may be any of a number of such solutions that are well known in the art. Following buffering of the tinted lens for the specified time, the lens is removed from the buffering solution, rinsed in an appropriate rinsing solution, which again may be sterile saline solution, and the now rinsed yet tinted soft contact lens is place in a sterile saline solution for storage until dispensed to the patient.

From the above it will be seen that the structure or apparatus, which may be used by a professional optician, optometrist or ophthalmologist to tint in his own office or laboratory "raw" contact lenses manufactured by others, is a simple apparatus, simple to use and effective in securing the degree of tinting of a soft contact lens that is appropriate for a particular patient. It will also be noted that while I have described only one such apparatus, most soft contact lenses that are tinted are tinted in pairs and the dispenser using this apparatus and method should of course be equipped with two such apparatuses so that a pair of soft contact lenses may be tinted at the same time so as to secure the same degree of color intensity in each of the lenses.

Having thus described the invention, what is believed to be new and novel and sought to be protected by letters patent of the United States is as follows:

I claim:

1. The method of tinting a contact lens by exposing selected areas of the lens to an appropriate and selected dye, comprising the steps of:
   (a) initially supporting the contact lens to be tinted on a surface completely conformable to the configuration of the posterior concave surface of the lens;
   (b) sealingly pressing the lens so supported on said surface conformable to the posterior concave surface of the lens against at least one surface defining an area of the lens from which dye is to be excluded while leaving other selected areas of the lens exposed;
   (c) flooding said other selected areas of the contact lens with a selected liquid dye whereby said liquid dye is in direct intimate contact with said selected areas of the lens;
   (d) retaining said liquid dye in direct intimate contact with said selected areas of the lens to be tinted for a predetermined interval correlated to the intensity of the color desired in the tinted lens;
   (e) thereafter remove said liquid dye from contact with said selected areas of the lens;
   (f) remove the tinted contact lens from the convex surface on which it is conformably supported;
   (g) immerse the tinted lens in a buffering solution for a predetermined interval;
   (h) thereafter remove the lens from the buffering solution and rinse all buffering solution from the tinted lens; and
   (i) thereafter store the tinted lens in a suitable saline solution until dispensed to a purchaser.

2. The method according to claim 1, in which said lens is raised to a temperature of about 150° F. during exposure to said liquid dye.

3. The method according to claim 1, in which said liquid dye is left in contact with said selected lens areas for a time correlated to the temperature of the dye and lens.

4. The method according to claim 1, in which said tinted lens is retained in said buffering solution for from one to three hours.

5. The method according to claim 1, in which immersion of the tinted lens in the buffering solution for a predetermined interval is effected after the lens is removed from the supporting surface that is completely conformable to the posterior concave surface of the lens.

6. The method according to claim 1, in which the rinsing of all buffering solution from the tinted lens is effected while the lens is separated from said surface that is conformable to the posterior concave surface of the lens.

* * * * *